Patented Aug. 21, 1928.

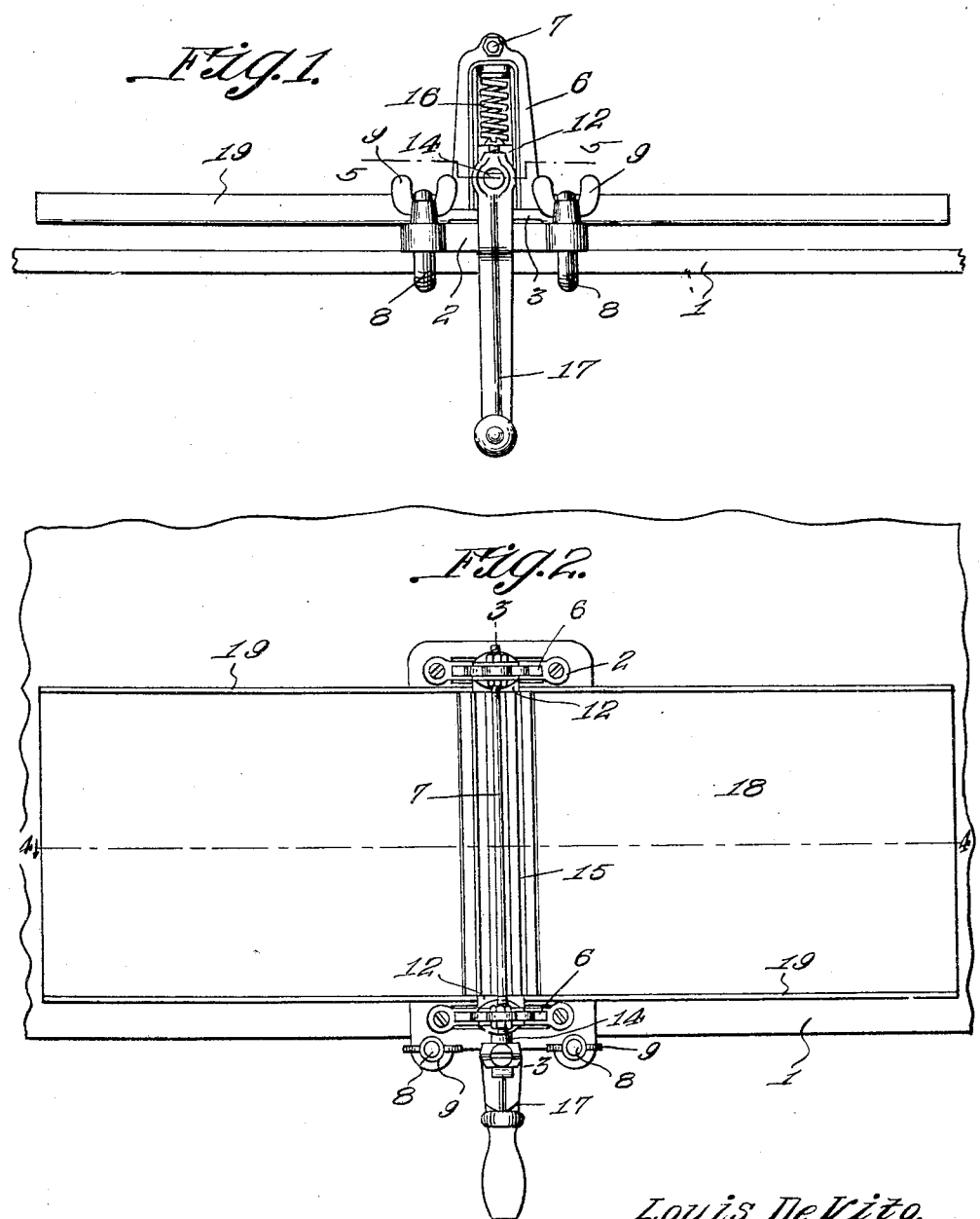

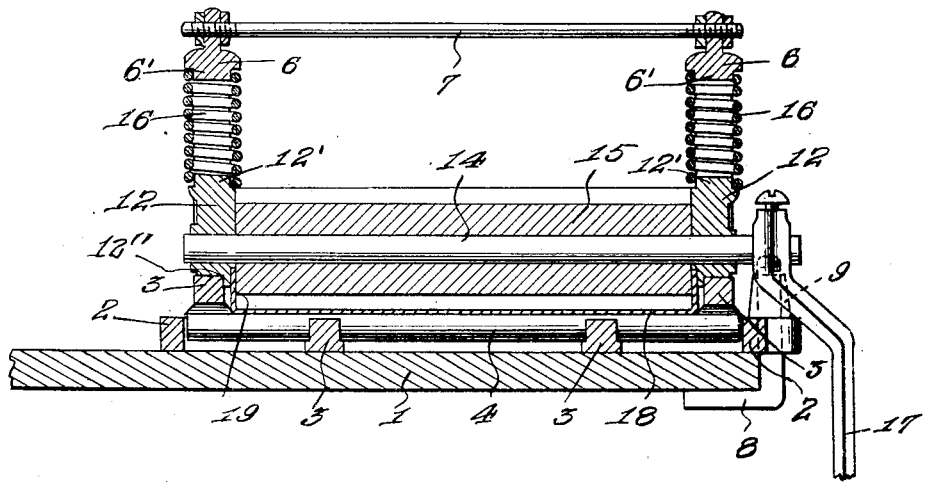
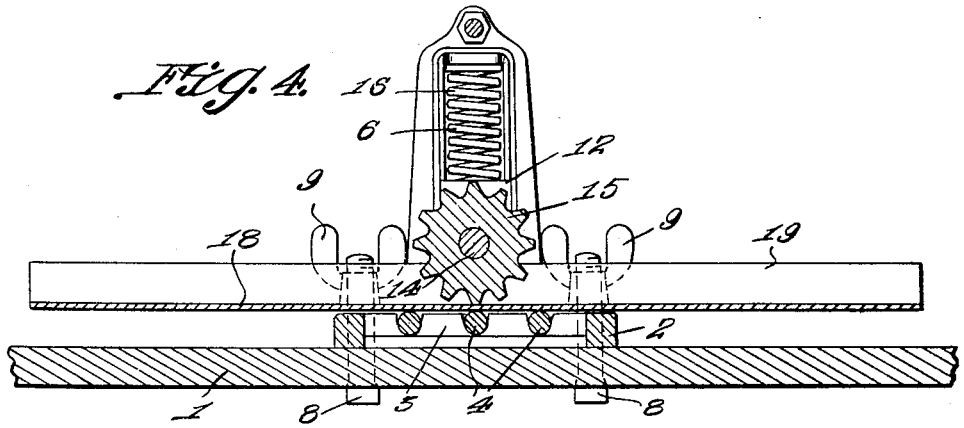
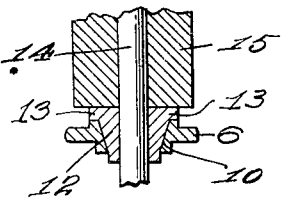

1,681,844

UNITED STATES PATENT OFFICE.

LOUIS DE VITO, OF CLEVELAND, OHIO.

DOUGH KNEADER.

Application filed September 21, 1927. Serial No. 221,067.

My present invention has reference to a dough kneading machine of a simple, cheap but thoroughly effective construction which will obviate the labor required in the kneading of dough by hand.

A further object is the provision of a dough kneading machine which is primarily designed for kneading dough to a proper consistency and to likewise roll the same into sheets so that the same can be cut into strips and employed for noodles.

A further object is the provision of a machine for this purpose that includes a pan mounted upon roller or like anti-frictional bearings, a spring influenced grooved roller arranged in the pan and operable by a suitable handle and whereby dough when mixed in the usual manner is placed and locked at one side of the pan and brought into contact with the roller, which latter is rotated to impart a reciprocatory movement to the pan and consequently to the dough therein so that the dough is thoroughly kneaded and arranged in a flat sheet or layer of even thickness, the said layer, if necessary, being doubled upon itself and again fed through the roller to obtain the desired consistency and elasticity and the sheet formed in the kneading operation may thereafter be cut into strips for the noodles cut thereby.

The drawings which accompany and form part of this application illustrate a satisfactory embodiment of the improvement reduced to practice.

In the drawings:

Figure 1 is a side elevation of a dough kneader in accordance with this invention.

Figure 2 is a top plan view thereof.

Figure 3 is a transverse sectional view on the line 3—3 of Figure 2.

Figure 4 is a detail sectional view approximately on the line 4—4 of Figure 2, upon a slightly enlarged scale.

Figure 5 is a detail sectional view approximately on the line 5—5 of Figure 1.

On the top of a table, bench or like support 1 I clamp my improvement. The improvement includes a substantially rectangular frame-like base 2, the longitudinal members of which being provided, at spaced intervals with transverse reinforcing ribs 3, and these ribs are provided with any desired number of alining notches whose inner walls are rounded and the walls of which notches provide bearings for rollers 4. The rollers are projected a slight but suitable distance above the top of the frame-like base 1. Arising from the ends of the base there are what I will term standards 6. The standards at their tops are connected together through the medium of an adjustable and removable rod 7. The base, at one of its ends, has its corners formed with projections in the nature of ears and through these ears there are passed the vertical arms of angle rods or clamps 8, the vertical arms of the said clamps being threaded and being engaged by wing nuts 9. These clamps hold the improvement on the bench or table 1.

The standards 6 have a central opening therethrough which extends the major length of the said standards, and the side walls provided by these openings are inclined, as indicated by the numeral 10, in Figure 5 of the drawings. Received through these openings there are the inwardly inclined side portions of bearings 12. The bearings have their sides at the terminal of their inclined walls formed with outstanding flanges that provide the same with shoulders 13 and these shoulders contact with the inner faces of the standards 6.

Journaled through the bearings 12 there is a shaft 14, and fixed on this shaft there is a peripherally grooved roller 15. The upper ends of the bearings 12 and the upper walls provided by the openings in the uprights that I have termed the standards 6, are preferably formed with bosses that afford bearings for helical springs 16 and these springs urge the bearings and consequently urge the rollers in the direction of the base frame 2.

Removably secured to one end of the shaft 14 there is a crank handle 17 and arranged between the standards 6 and finding a bearing on the rollers 4 there is a pan 18 that has upstanding sides 19. The roller 15 has its ends disposed in close proximity or in slight contact with the flanges 19 of the pan 18.

In operation flour mixed with eggs or water in the usual manner is placed in a lump in the pan at one side of the roller. The handle is operated to revolve the roller and the teeth thereof engaging with the dough will draw the dough therebeneath and will impart a longitudinal movement to the pan 18. The handle is operated so that the pan is reciprocated longitudinally over the base or frame for a determined period, so that the dough is effectively kneaded and is arranged in a flat sheet in the pan. If desired this sheet may be centrally folded on itself and the roller again operated as above described. This last operation is only necessary when the dough has not first been kneaded to the desired consistency and elasticity. The improvement is primarily designed for kneading and forming the dough into sheets so that the same can be cut into strips and fed to a noodle cutter so that the said dough is primarily employed for making noodles.

By reference to the drawings it is to be noted that the upper wall provided by the spring receiving opening in the standards is formed with a boss 6' to be inserted in the upper convolution of the spring 16. It will also be noted that the bearings 12 are formed with similar spring receiving bosses 12' and in this manner the springs 16 are properly retained in their housing and are held from bulging. Also it will be seen, especially by reference to Figure 3 of the drawings, that the bearings 12 have their lower corners notched to provide the same with longitudinal depressed portions 12" so that a space is thus provided between the inner walls provided by the depressions and the outer ends of the roller 15 for the reception of the flanges 19 of the pan 18. This effectively holds the pan against any tendency of lateral movement and properly arranges the roller in the full width of the pan.

The simplicity of my construction and the advantages thereof will, it is thought, be perfectly apparent to those skilled in the art to which such invention relates when the foregoing description has been carefully read in connection with the accompanying drawings but obviously I do not wish to restrict myself to the precise construction of details as herein set forth and, therefore, hold myself entitled to make such changes therefrom as fairly fall within the scope of what I claim.

Having described the invention, I claim:

1. In a dough kneading machine of the type described, a pan having side flanges, a base frame on which the pan rests, said frame having bearing notches and rollers arranged in said notches projecting above the top of the frame and providing a support for the pan, a spring influenced roller carried by the base arranged in the pan, and a handle for revolving the roller.

2. In a dough kneading machine of the type set forth, a substantially rectangular base frame, adjustable clamps carried by the frame, said frame having transverse ribs which are notched, rollers finding bearings in the notches and projected slightly above the frame, standards arising from the ends of the frame, and having central openings therethrough, bearings in said openings, springs influencing the bearings in the direction of the base, a shaft journaled through the bearings, a peripherally toothed roller fixed on the shaft, a flanged pan resting on the first mentioned rollers and receiving the toothed roller therein, and an operating handle for the shaft.

3. In a dough kneading machine of the type described, a substantially rectangular base frame, adjustable clamps carried by the frame, said frame having transverse ribs which are notched, rollers finding bearings in the notches and projected slightly above the frame, standards arising from the ends of the frame, having central openings therethrough whose side walls are beveled, bearings having inwardly inclined side walls received through the openings and contacting with the side walls thereof, said bearings having shoulders for engaging with the inner faces of the standards, a coil spring in the opening of each standard urging the bearings toward the base, a peripherally grooved roller fixed on the shaft, a removable handle and a pan resting on the first mentioned rollers and receiving the grooved roller therein.

4. In a dough kneading machine of the type described, a pan having side flanges, a base on which the pan rests, anti-frictional rollers journaled on the base to provide a support for the pan, standards arising from the sides of the base, spring influenced bearings carried by the standards, said bearings having their inner faces, at the lower edges, recessed longitudinally to provide for the reception of the flanges of the pan in said recesses, a handle operated shaft journaled through the bearings, and a grooved roller fixed on the shaft received between the bearings and contacting with the side flanges of the pan.

5. In a dough kneading machine of the type described, a base, anti-frictional rollers on the base, slotted standards arising from the sides of the base and having central openings therethrough, and the upper walls provided by said openings having inwardly directed bosses, bearings guided in the openings of the standards and having upper bosses, helical springs received in the openings and receiving in the ends thereof the mentioned bosses of the bearings and standards, a pan having upstanding side flanges arranged for movement on the anti-frictional bearings, a handle operated shaft journaled through the spring influenced bearings, a grooved roller fixed on the shaft and received in the pan, and the confronting faces of the bearings, at the lower portions thereof, being notched, and said notches with the outer ends of the roller providing guides for the flanges of the pan.

In testimony whereof I affix my signature.

LOUIS DE VITO.